United States Patent [19]

Maurer et al.

[11] 4,385,040
[45] May 24, 1983

[54] PROCESS FOR MAKING GRANULATED ALKALI METAL ORTHOPHOSPHATES

[75] Inventors: Alexander Maurer; Renate Adrian, both of Hürth, Fed. Rep. of Germany

[73] Assignee: Hoechst Aktiengesellschaft, Fed. Rep. of Germany

[21] Appl. No.: 344,481

[22] Filed: Feb. 1, 1982

[30] Foreign Application Priority Data

Feb. 7, 1981 [DE] Fed. Rep. of Germany ....... 3104403

[51] Int. Cl.³ .................... C01B 15/16; C01B 25/26
[52] U.S. Cl. .................... 423/267; 423/274; 423/305; 423/312; 252/385
[58] Field of Search ............... 423/312, 315, 266, 267, 423/305, 274; 252/385; 23/313 R

[56] References Cited

U.S. PATENT DOCUMENTS 2,958,577 11/1960 Arvan .................................. 423/315
3,110,559 11/1963 Bigot .................................. 423/315
3,233,967 2/1966 Shen .................................. 423/315

FOREIGN PATENT DOCUMENTS 2008495 9/1971 Fed. Rep. of Germany .

OTHER PUBLICATIONS

Winnacker et al., Chemische Technologie, Band 1, Anorganische Technologie I, (1970) p. 371.

Primary Examiner—O. R. Vertiz
Assistant Examiner—Gregory A. Heller
Attorney, Agent, or Firm—Connolly and Hutz

[57] ABSTRACT

The disclosure relates to a process for making granulated, hydrated alkali metal orthophosphates. To this end, the disclosure provides for one or more anhydrous or partially hydrated alkali metal orthophosphates presenting a degree of hydration of less than 90%, based on the theoretically possible degree of hydration, and containing an at least 20% proportion of particles with a size of less than 0.045 mm, to be intensively mixed and granulated with water and an ammonium polyphosphate.

10 Claims, No Drawings

PROCESS FOR MAKING GRANULATED ALKALI METAL ORTHOPHOSPHATES

The present invention relates to a process for making granular alkali metal orthophosphates.

Alkali metal orthophosphates find very widespread uses, normally in the form of pulverulent or coarsely crystalline material. In certain cases, it would be desirable for the alkali metal orthophosphate to be used in the form of granular material to facilitate manipulation and avoid the formation of dust. Processes suitable for transforming pulverulent alkali metal orthophosphates into such granular material, which should be highly abrasion-resistant are, however, not available for the time being.

It has been described that superphosphate fertilizers should conveniently be used in the form of granular material. As described by Winnacker-Küchler, Chemische Technologie (1970), volume I, page 371, ground superphosphate is granulated inside a drum by spraying water on to it, the resulting granulate being successively dried in a second drum. This process is, however, not directly of assistance in the granulation of pulverulent alkali metal orthophosphates inasmuch as the resulting products fail to be abrasion-resistant and storable, and they coalesce after a short while.

The manufacture of granular alkali metal triphosphate has also been described. DE-PS No. 20 08 495, for example, describes a process for making granular alkali metal polyphosphates, wherein alkali metal triphosphate having a certain particle size in granulated by spraying an aqueous alkali metal orthophosphate solution thereonto, the granulated material being dried and calcined by heating it to temperatures between 300° and 600° C. While this process yields granular sodium tripolyphosphate of desirable particle size and properties, the fact remains that the steps of drying and calcining the granulated material are energy-expensive operations which should conveniently be dispensed with in view of increasing energy costs.

These technically adverse effects associated with the prior art methods are avoided in the process of this invention.

The present invention relates more particularly to a process for making granulated, partially or completely hydrated alkali metal orthophosphates, which comprises: intensively mixing and granulating one or more anhydrous or partially hydrated alkali metal orthophosphates presenting a degree of hydration of less than 90%, based on the theoretically possible degree of hydration, and containing an at least 20% proportion of particles with a size of less than 0.045 mm, with a quantity of water at most necessary to completely hydrate the alkali metal orthophosphate(s), and with an ammonium polyphosphate, this latter presenting a degree of condensation of at least 3 up to about 1000, preferably 10 to 1000, and being used in a proportion of about 0.5 to 8 weight %, based on the quantity of water employed.

The alkali metal orthophosphates should be selected from pulverized, anhydrous or partially hydrated products of which a proportion of at least 20%, preferably of more than 50%, consists of particles with a size of less than 45 microns. More specifically, it is good practice, for example, to granulate anhydrous alkali metal orthophosphate consisting to an extent of 20 to 100% of particles with a size of less than 0.045 mm,
up to 80% of particles with a size between 0.045 and 0.1 mm, and
up to 50% of particles with a size larger than 0.1 mm.

The proportion of finer particles, within the limits specified, of the phosphate is intended to fill the hollow spaces in the granulate and, in this way, to strengthen the individual particles. It is possible for the orthophosphate to be used in the form of crystalline or amorphous material provided that it is still able to absorb water in a quantity sufficient for hydrate formation. Use should more preferably be made of alkali metal orthophosphate partially hydrated to an extent of 0.05 to 50%.

As regards the water needed for granulation, it is preferable for it to be used in a proportion of at least 10 weight %, based on the anhydrous alkali metal orthophosphate.

The ammonium polyphosphate which is used in accordance with this invention corresponds to the following general formula:

$$H_{(n-m)+2}(NH_4)_m P_n O_{3n+1}$$

in which n stands for a whole number with an average value of 3 to 1000, preferably 10 to 1000, m stands for a whole number of at most n+2, and m/n is about 1.0 to 1.67.

The process of this invention can be carried out, for example, as follows: A blend of anhydrous or partially hydrated alkali metal orthophosphate and ammonium polyphosphate is intensively agitated while water is sprayed thereonto, or an aqueous 0.5 to 5 weight % solution or suspension of ammonium polyphosphate is sprayed on to the alkali metal orthophosphate, the ammonium polyphosphate being preferably used in a proportion of 0.5 to 5 weight %, based on the quantity of water. The granulation can be effected with the use of standard devices, such as a granulating plate or drum, mixer, rotating tube, fluidized bed drier and the like. The liquid inducing granulation is sprayed through a nozzle on to solid phosphate, the water being bound by a chemical reaction. In this way, the use of excess water is avoided and solid dry granulate which need not subsequently be dried and calcined, is obtained.

Sodium dihydrogen phosphate, for example, which is granulated in accordance with this invention, presents a water content at most equal to that of the dihydrate. It is therefore not necessary for it to be dried and calcined, after granulation.

Despite the fact that the granulate is not dried and calcined, it has the strength necessary to permit its incorporation into detergent compositions, for example. On being dissolved in water, the granulate could not be found to coalesce. Nor could its content of ammonium polyphosphate be found to give rise to the formation of fractions insoluble in water, which is highly desirable for the use of the granulate in detergents.

Granulate with desirable particle size distribution should preferably be made by passing product directly coming from the granulation through a suitable sieve.

The following Examples illustrate the invention:

EXAMPLE 1

15 kg anhydrous NaH$_2$PO$_4$ which contained 59% P$_2$O$_5$ and of which 94% consisted of particles with a size of less than 45 microns was placed on a rotating plate with a diameter of 1 m, and a 4 weight % solution of ammonium polyphosphate with a mean chain length of 270 in water was sprayed thereonto over a period of 30 minutes. The resulting granulate was hard and abrasion-resistant. It had a mean particle size of 1.2 mm and could not be found to have coalesced even after storage over 4 weeks in a plastic bag. The granulate had the following properties:

| | | |
|---|---|---|
| $P_2O_5$-content | 52 | weight % |
| $H_2O$-content | 12.1 | weight % |
| Apparent density | 693 | g/l |
| Abrasion-resistance (drum test) | 80% | |

Particle size distribution:
particles larger than:

| | | |
|---|---|---|
| 2.0 mm | = | 12.9% |
| 0.7 mm | = | 86.8% |
| 0.35 mm | = | 96.7% |
| 0.2 mm | = | 98.6%, smaller than |
| 0.2 mm | = | 1.4%. |

EXAMPLE 2

The procedure was as in Example 1, but 20 kg anhydrous $Na_2HPO_4$ which contained 48% $P_2O_5$ and of which 51% consisted of particles with a size smaller than 0.045 mm was used. Hard, abrasion-resistant granulate was obtained again. Even after storage over 4 weeks in a plastic bag, the granulate remained stable and did not coalesce. The granulate had the following properties:

| | | |
|---|---|---|
| $P_2O_5$-content | 40.3 | weight % |
| $H_2O$-content | 20.7 | weight % |
| Apparent density | 708 | g/l |
| Abrasion resistance | 85% | |

Particle size distribution:
particles larger than

| | | |
|---|---|---|
| 2.0 mm | = | 7.1% |
| 0.7 mm | = | 81.8% |
| 0.35 mm | = | 92.5% |
| 0.2 mm | = | 97.1%, smaller than |
| 0.2 mm | = | 2.9%. |

EXAMPLE 3

The procedure was as in Example 1, but 20 kg anhydrous $Na_3PO_4$ which contained 40% $P_2O_5$ and of which 91% consisted of particles with a size of less than 0.045 mm was used. Hard, abrasion-resistant granulate was obtained. Even after storage over 4 weeks in a plastics bag, the granulate remained stable and did not coalesce. The granulate had the following properties:

| | | |
|---|---|---|
| $P_2O_5$-content | 30.1 | weight % |
| $H_2O$-content | 31.7 | weight % |
| Apparent density | 730 | g/l |
| Abrasion resistance | 89% | |

Particle size distribution:
particles larger than

| | | |
|---|---|---|
| 2.0 mm | = | 5.4% |
| 0.7 mm | = | 72.0% |
| 0.35 mm | = | 88.9% |
| 0.2 mm | = | 95.1%, smaller than |
| 0.2 mm | = | 4.9%. |

EXAMPLE 4

(Comparative Example)

The procedure was as in Example 1, save that just water was used for granulation. A granulate which had the following particle size distribution, contained an increased proportion of particles with a size of less than 0.2 mm, and was distinctly less abrasion-resistant than the products obtained in Examples 1 through 3, was obtained. In addition to this, the product was not storable since it had water of adhesion contained in it which made it coalesce in a polyethylene bag, already after 3 days. The granulate had the following properties:

| | |
|---|---|
| $H_2O$-content | 24.3% |
| Apparent density | 570 g/l |
| Abrasion resistance | 60% |

Particle size distribution:
particles larger than

| | | |
|---|---|---|
| 2.0 mm | = | 3.1% |
| 0.7 mm | = | 18.0% |
| 0.35 mm | = | 48.6% |
| 0.2 mm | = | 84.5%, smaller than |
| 0.2 mm | = | 15.5%. |

We claim:

1. A process for making granulated, partially or completely hydrated alkali metal orthophosphates which comprises: intensively mixing and granulating at least one anhydrous or partially hydrated alkali metal orthophosphate presenting a degree of hydration of less than 90%, based on the theoretically possible degree of hydration, and containing an at least 20% proportion of particles with a size of less than 0.045 mm, with a quantity of water at most necessary to completely hydrate the alkali metal orthophosphate, and with an ammonium polyphosphate, this latter presenting a degree of condensation of at least 3 up to 1000 and being used in a proportion of about 0.5 to 8 weight %, based on the quantity of water.

2. The process as claimed in claim 1, wherein anhydrous alkali metal orthophosphate consisting essentially of 20 to 100% of particles with a size of less than 0.045 mm, up to 80% of particles with a size between 0.045 mm and 0.1 mm, and up to 50% of particles with a size larger than 0.1 mm is granulated.

3. The process as claimed in claim 1, wherein alkali metal orthophosphate partially hydrated to an extent of 0.05 to 50% is used.

4. The process as claimed in claim 1, wherein anhydrous alkali metal orthophosphate is granulated and the water used for granulating is employed in a proportion of at least 10 weight %, based on the anhydrous alkali metal orthophosphate.

5. The process as claimed in claim 1, wherein the ammonium polyphosphate used has the following general formula $$H_{(n-m)+2}(NH_4)_m P_n O_{3n+1}$$

in which n stands for a whole number with an average value of 3 to 1000, m stands for a whole number of at most n+2, and m/n is about 1.0 to 1.67.

6. The process as claimed in claim 1, wherein the granulated alkali metal orthophosphate is made by spraying water with vigorous agitation on to a blend of anhydrous or partially hydrated alkali metal orthophosphate and ammonium polyphosphate, or by spraying an aqueous solution or suspension of the ammonium polyphosphate on to the alkali metal orthophosphate.

7. The process as claimed in claim 6, wherein an aqueous about 0.5 to 5 weight % solution or suspension of ammonium polyphosphate is sprayed on to the alkali metal orthophosphate.

8. The process as claimed in claim 1, wherein the ammonium polyphosphate is used in a proportion of 0.5 to 5 weight %, based on the quantity of water.

9. The process as claimed in claim 1, wherein the ammonium polyphosphate has an integral average value of 10 to 1000 and the ratio of m/n is about 1.

10. A process for making granulated, partially or completely hydrated alkali metal orthophosphates from pulverized orthophosphates which comprises: intensively mixing and granulating at least one anhydrous or partially hydrated alkali metal orthophosphate presenting a degree of hydration of less than 90%, based on the theoretically possible degree of hydration, and containing an at least 20% proportion of particles with a size of less than 0.045 mm, with a quantity of water at most necessary to completely hydrate the alkali metal orthophosphate, said granulating being carried out with the aid of an ammonium polyphosphate having a degree of condensation of at least 3 up to 1000 and being used in a proportion of about 0.5 to 8 weight %, based on the quantity of water, and recovering the granulated, partially or completely hydrated alkali metal phosphate as a non-calcined final product.

* * * * *